(No Model.) 7 Sheets—Sheet 1.

J. H. McCUTCHEON.
GRAIN BINDER.

No. 371,341. Patented Oct. 11, 1887.

Witnesses.
John E. Parker
James F. Tobin

Inventor
John H. McCutcheon
by his Attys.
Howson & Sons (No Model.) 7 Sheets—Sheet 2.

J. H. McCUTCHEON.
GRAIN BINDER.

No. 371,341. Patented Oct. 11, 1887.

Witnesses:
John E. Barter
James J. Tobin

Inventor
John H. McCutcheon
by his Attys
Howson & Sons (No Model.)
7 Sheets—Sheet 3.
J. H. McCUTCHEON.
GRAIN BINDER.
No. 371,341. Patented Oct. 11, 1887.
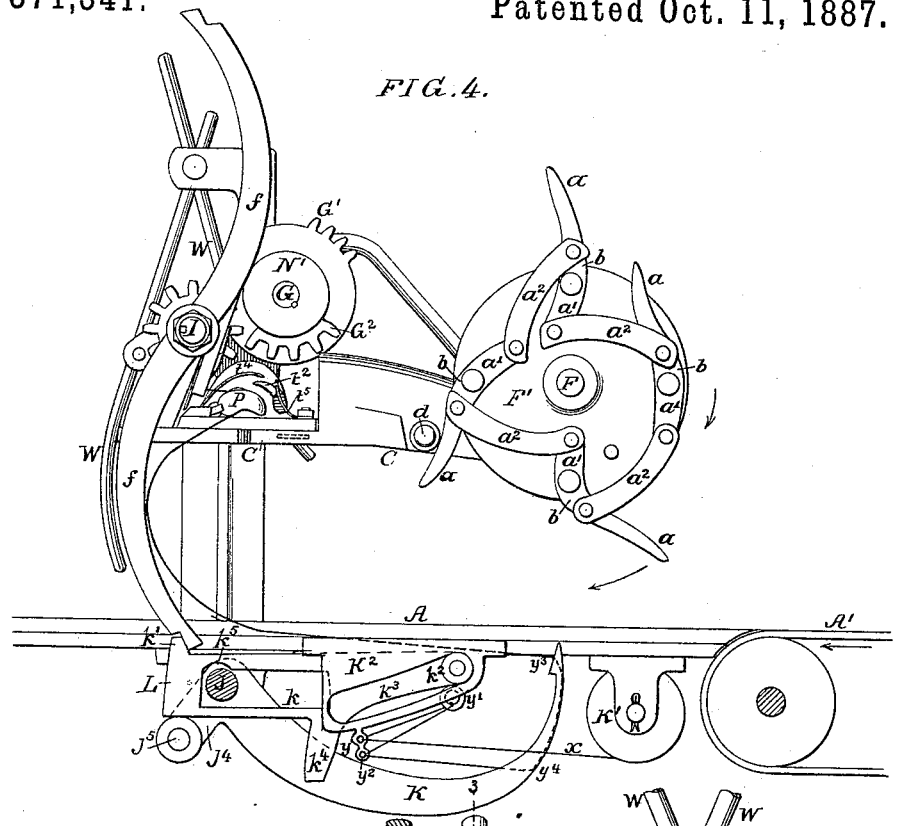
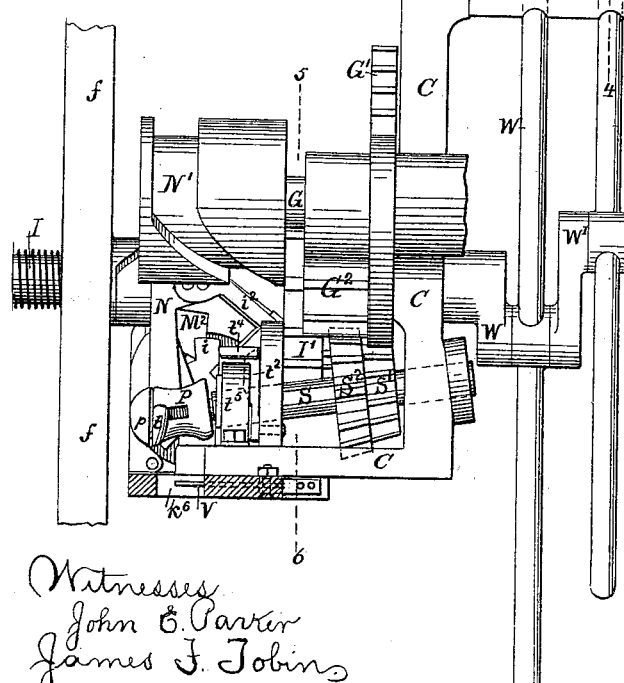
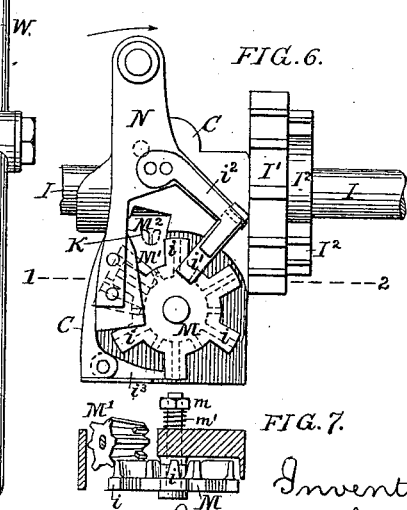
Witnesses
John E. Parker
James F. Tobin
Inventor
John H. McCutcheon
by his attys
Howson & Sons (No Model.) 7 Sheets—Sheet 4.
J. H. McCUTCHEON.
GRAIN BINDER.
No. 371,341. Patented Oct. 11, 1887.
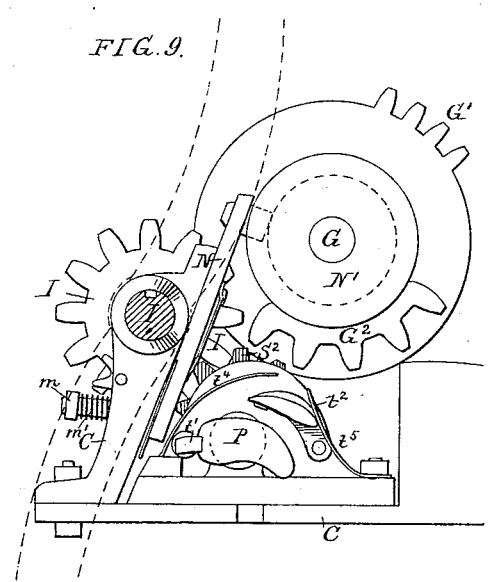
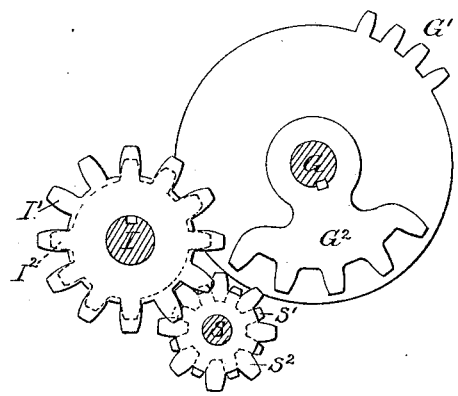
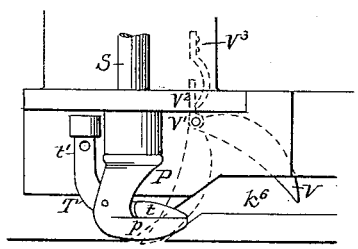
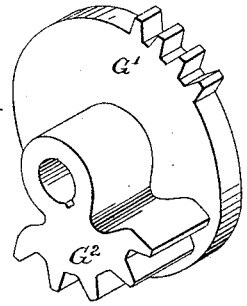
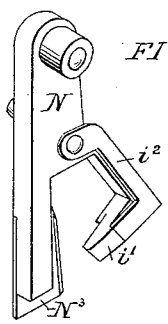
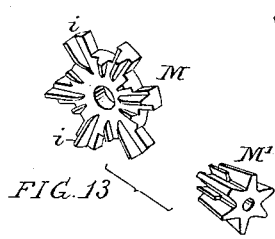
Witnesses
John E. Parker
James J. Tobin
Inventor
John H. McCutcheon
by his Attys
Howson & Sons (No Model.) 7 Sheets—Sheet 5.
J. H. McCUTCHEON.
GRAIN BINDER.
No. 371,341. Patented Oct. 11, 1887.
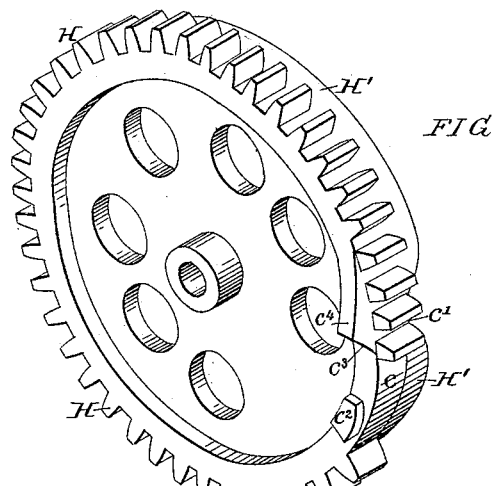
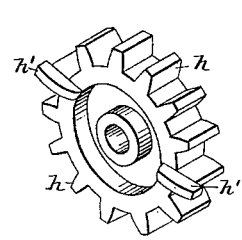
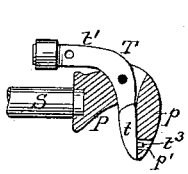
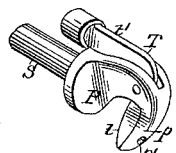
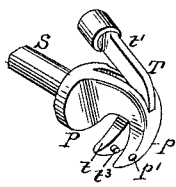
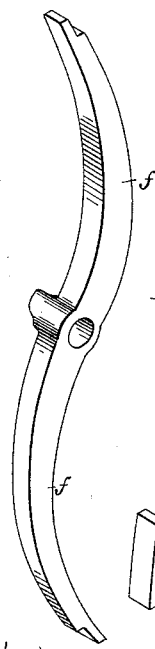
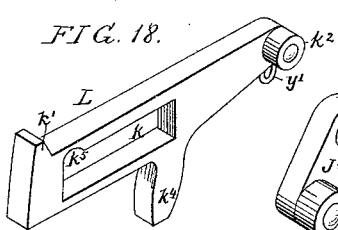
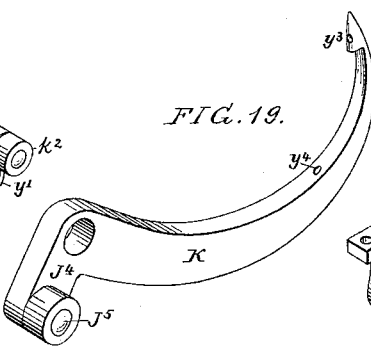
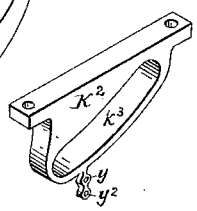
Witnesses:
John E. Parker
James J. Tobin
Inventor
John H. McCutcheon
by his Attys
Howson & Sons

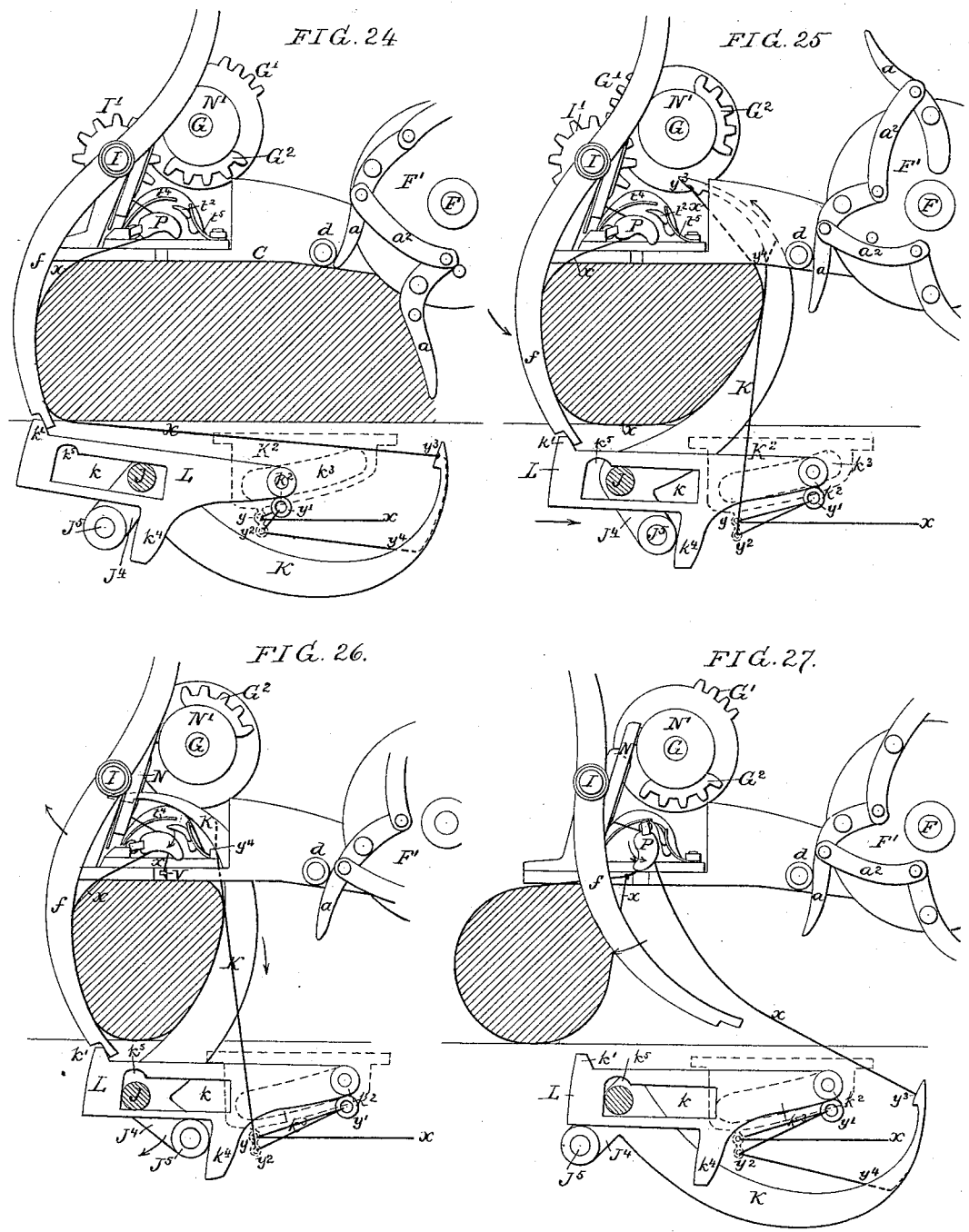

(No Model.) 7 Sheets—Sheet 7.

J. H. McCUTCHEON.
GRAIN BINDER.

No. 371,341. Patented Oct. 11, 1887.

Witnesses.
John E. Parker
James J. Tobins

Inventor
John H. McCutcheon
by his Attys
Howson & Son

UNITED STATES PATENT OFFICE.

JOHN H. McCUTCHEON, OF CAMERON, MISSOURI, ASSIGNOR OF ONE-HALF TO WILLIAM S. KIRK, OF PHILADELPHIA, PENNSYLVANIA.

GRAIN-BINDER.

SPECIFICATION forming part of Letters Patent No. 371,341, dated October 11, 1887.

Application filed May 5, 1884. Serial No. 130,359. (No model.)

*To all whom it may concern:*

Be it known that I, JOHN H. McCUTCHEON, a citizen of the United States, residing in Cameron, Clinton county, Missouri, have invented certain Improvements in Grain-Binders, of which the following is a specification.

The object of my invention is to so construct grain-binding mechanism for harvesters that the mechanism will be compact, the actions direct, and the greater part of the machinery above the table on which the bundle is formed, so that said table can be placed close to the ground; and this object I attain in the manner hereinafter set forth, reference being had to the accompanying drawings, in which—

Figure 1:
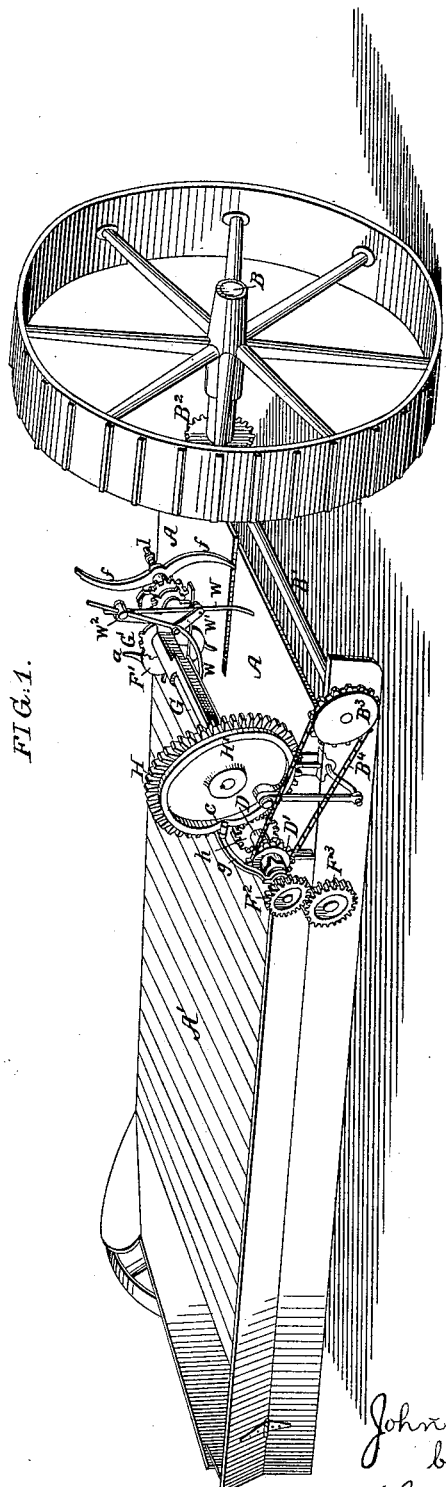
Figure 2:
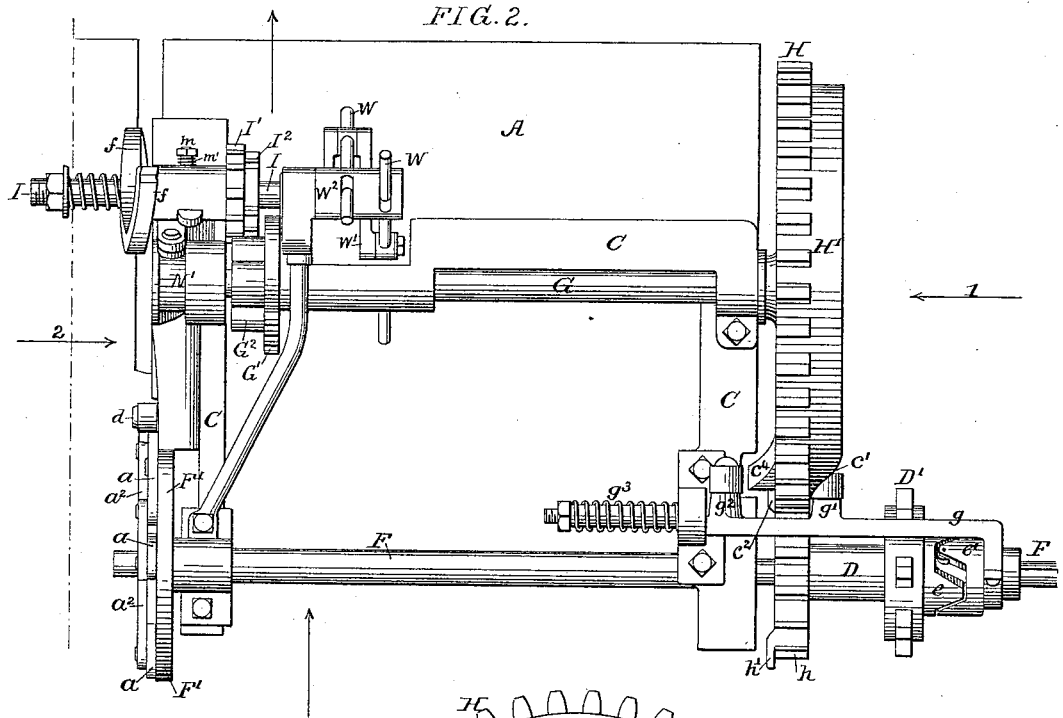
Figure 3:
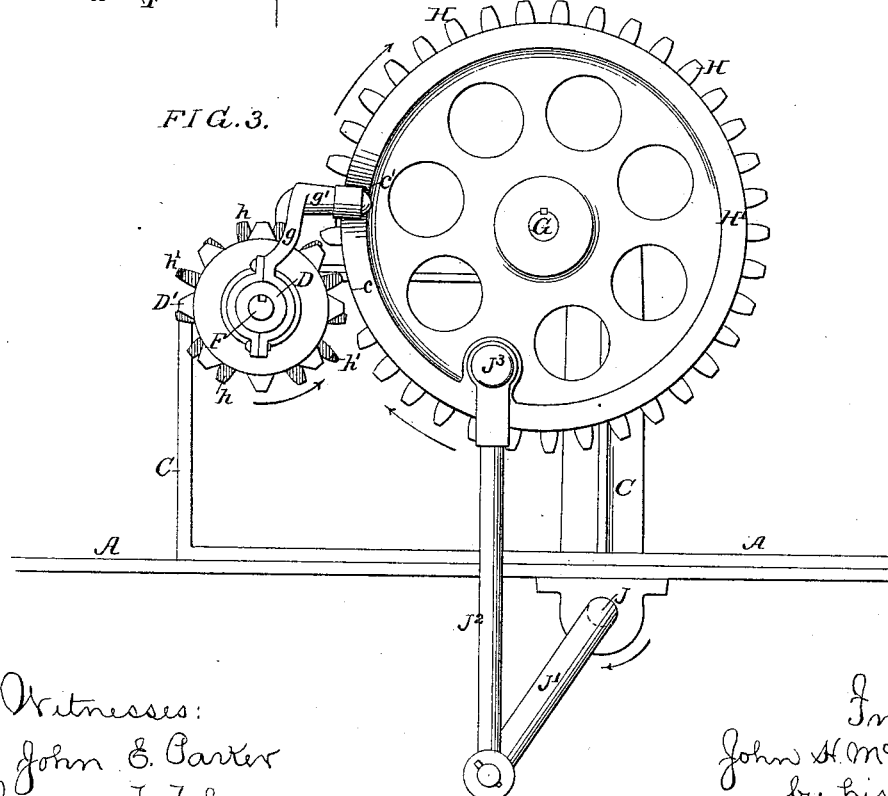
Figure 28:
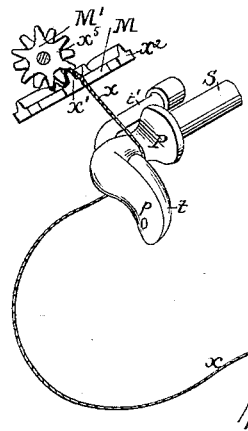
Figure 29:
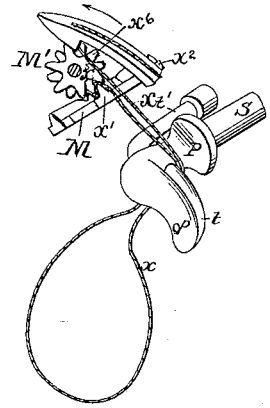
Figure 30:
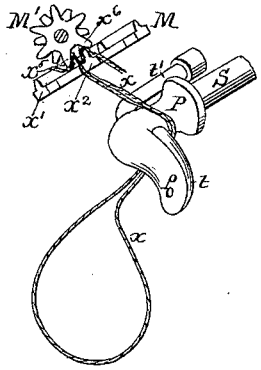

Figure 1, Sheet 1, is a perspective view from the rear corner, showing my improved grain-binding mechanism applied to the table and apron of a harvester; Fig. 2, Sheet 2, a plan view, on a larger scale, of the parts to which my invention relates; Fig. 3, an end view looking in the direction of the arrow 1, Fig. 2; Fig. 4, Sheet 3, an end view looking in the direction of the arrow 2, Fig. 2; Fig. 5, a detached face view, drawn to a still larger scale, of the mechanism for holding, knotting, and cutting the binding-twine; Fig. 6, a view looking in the same direction, but with some of the parts shown in Fig. 5 removed; Fig. 7, a sectional plan on the line 1 2, Fig. 6; Fig. 8, a transverse section on the line 3 4, Fig. 5; Fig. 9, Sheet 4, an end view of the knotting mechanism on the same scale as Fig. 5; Fig. 10, a transverse section on the line 5 6, Fig. 5; Fig. 11, detached perspective views of the gearing shown in Fig. 10; Fig. 12, a detached view showing the devices for throwing the twine in the path of the knotter; Fig. 13, detached perspective views of the twine-holding wheels; Fig. 14, a perspective view of the twine-cutting knife and the lever for operating the twine-holding wheels; Figs. 15 and 16, Sheet 5, perspective views of gear-wheels connected with the devices for forming the grain-bundle; Figs. 17 to 20, perspective views of devices for retaining the grain until the bundle is formed and tied; Figs. 21, 22, and 23, views of the twine-knotting device; Figs. 24 to 27, Sheet 6, diagrams illustrating the operation of the devices for compressing and binding the grain-bundle; Figs. 28 to 30, Sheet 7, diagrams illustrating the action of the twine-holder; Figs. 31 to 35, diagrams illustrating the formation of the knot.

In the general perspective view, Fig. 1, A shows the binding-table of a grain binding harvester, and B the transverse shaft or axle, from which are driven the bundling and tying mechanism, and the endless apron A', which receives the grain, and by which it is presented to the said bundling and tying mechanism, a shaft, B', being driven by bevel-gearing B² from the axle B, and this shaft having a chain-wheel, B³, the chain B⁴ from which passes round a chain-wheel, D', on the driving-clutch sleeve D, which actuates the bundling and tying mechanism, said sleeve being loosely hung on the packer-shaft F.

For convenience of description, and with the view of most readily imparting an understanding of my invention, I have divided the same into five parts, as follows: First, the gearing whereby the bundling, binding, and tying devices are driven from the driving-sleeve D; second, the devices for forming the bundle; third, the devices for binding the bundle; fourth, the devices for tying the knot in the binding-twine, and, fifth, the mechanism for retaining the bundle during the binding operation, and delivering it when bound.

I will first describe the second feature of the invention—namely, the devices for forming the bundle.

Reference should be had to Figs. 1, 2, and 4. The stalks of grain, as they are fed onto the table A, are brought under the action of the packer-fingers *a*, forming the long arms of levers *b*, which are pivoted to the face of a disk, F', carried by a packer-shaft, F, the latter being adapted to bearings in standards C on the table A, and being driven from the sleeve D (through which it passes) by means of clutch mechanism, as described hereinafter. The packer-fingers *a* project beyond the periphery of the disk F', four levers *b* being shown in the present instance, and the short arm *a'* of each lever being connected to the long arm or finger *a* of the lever in advance by means of a link, *a²*, so that a movement of any one of the levers is transmitted to the others. On one of the standards C is a pin, *d*, which, as the disk F' rotates in the direction of the arrow, Fig.

4, comes into the path of the packer-fingers $a$, as shown in that figure, and causes the lever, of which the finger forms part, to turn upon its pivot, this movement being transmitted to the following lever, so as to cause the finger $a$ of the latter to sweep down upon and move forward the grain lying upon the table A. During this movement, and as long as the packer-finger $a$ of the lever in advance is under the control of the pin $d$, the acting finger is locked in position and prevented from swinging backward; but as soon as the finger $a$ of the forward lever is free from the control of the pin the acting finger is at liberty to yield to the pressure of the bundle, and is thus prevented from carrying up the stalks with it as it rises. The grain is fed forward against a retaining-arm, $f$, carried by a shaft, I, and operated, as described hereinafter, to release the grain-bundle after it is bound. All of the bundle binding, tying, and releasing devices receive their movements from a shaft, G, adapted to bearings on the standards C and receiving its movement from the sleeve D, under control of bundling mechanism; hence I will now describe what I have in the summary mentioned as the first feature of the invention—namely, the gearing whereby this shaft G is driven from the sleeve D.

The sleeve D can turn freely on the shaft F, and forming part of the chain-wheel D' on the end of said sleeve D is one-half, $e$, of a clutch, the projections and recesses of which are adapted to the recesses and projections of a clutch-sleeve, $e'$, free to slide on the shaft F, but having a spline for entering a groove in the shaft, so that the latter must turn with the sleeve $e'$. A portion of this sleeve $e'$ is embraced by the end of a guided bar, $g$, which has fingers $g'$ and $g^2$, and is acted upon by a spring, $g^3$, the tendency of which is to maintain the sleeve $e'$ in engagement with the clutch-half $e$ of the sleeve D, the projections and recesses of the two parts of the clutch being beveled, however, and the projections of the sleeve $e'$ being furnished with anti-friction rollers, (as shown in Fig. 2,) so that as soon as there is a certain amount of resistance to the rotation of the shaft F—that is to say, as soon as the bundle of grain on the table A has accumulated to the desired extent and interferes with the forward movement of the fingers $a$—the power of the spring $g^3$ will be overcome and the sleeve $e'$ will be forced out of engagement with the sleeve D. Secured to the opposite end of the sleeve D is a pinion, $h$, on the back of which are two fingers, $h'$, and to the shaft G is secured a spur-wheel, H, having several of its teeth cut away, so as to form a space, $c$, the front of this wheel having a flange, H', with a notch, $c'$, and the back of the wheel being furnished with a lug, $c^2$, and a projection having inclines $c^3$ and $c^4$. (See Figs. 2, 3, 15, and 16.)

During the accumulation of the bundle of grain the parts occupy the relation shown in Figs. 2 and 3, the teeth of the pinion $h$ working in the space $c$ of the wheel H, which is locked in position by the engagement with the notch $c'$ in the flange of an anti-friction roller on the arm $g'$ of the bar $g$. As soon, however, as the clutch-sleeve $e'$ is moved out of engagement with the sleeve D, this roller is removed from the notch and a roller on the finger $g^2$ acts upon the inclined projection $c^3$ of the wheel H, so as to move the latter slightly forward and bring its lug $c^2$ into the path of one of the fingers $h'$ of the pinion $h$, whereby the wheel is moved forward still farther and is thrown into gear with said pinion, which imparts to the wheel one revolution—that is to say, it turns the same until the space $c$ is again brought into line with the pinion $h$ and the notch $c'$ into line with the roller on the finger $g'$, so as to permit the movement of the bar $g$, under control of the spring $g^3$, and the engagement of the clutch-sleeve $e'$ with the sleeve D, so as to again rotate the shaft F. In order to insure this movement of the bar $g$ and the locking of the wheel H after it has made one revolution, the action of the spring $g^3$ is supplemented by the action of the inclined projection $c^4$ upon the roller. It will thus be seen that the operation of the shaft G is dependent upon the accumulation of sufficient grain to form the desired bundle, whereupon the shaft F is thrown out of gear until the bundle has been bound and discharged, the said shaft F being then again thrown into gear to effect the formation of a fresh bundle. The drum which operates the endless conveying-belt A' is driven from the shaft F through the medium of spur-wheels $F^2$ $F^3$, as shown in Fig. 1, so that while the shaft F and the bundling-fingers are out of action the movement of the conveyer belt is also arrested; hence there is no undue accumulation of grain to be disposed of when the shaft F is again thrown into gear, as there would be if the belt A' continued its movement during the stoppage of the shaft F.

I will next describe the third feature of my invention, the devices for binding the bundle. These are shown in Figs. 3, 4, 5, 6, 7, 13, 14, 24, 25, 26, 27, 28, 29, and 30.

Beneath the table A is a shaft, J, which has at one end a crank, J', connected by a rod, $J^2$, to a crank-pin, $J^3$, on the wheel H, as shown in Fig. 3, so that on each revolution of the said wheel a rocking movement will be imparted to the shaft J, the opposite end of which carries the binding-needle K. This needle works through a slot in the table A, beneath which is the twine-spool K', the twine $x$ passing from the latter, first through a fixed eye, $y$, on a boss, $K^2$, below the table, then through an eye, $y'$, on a sliding plate, L, then through another eye, $y^2$, on the boss $K^2$, then through the eyes $y^4 y^3$ of the needle, and thence to the retaining device. This device consists of a pair of bevel-wheels, M M', the spindles of which are adapted to suitable bearings in the standard C, the wheel M having projections $i$, which are acted upon by a pawl, $i'$, hung to the end of one arm of a lever, N, as shown in Fig. 6, and acted upon by a spring, $i^2$, the tendency of which is to depress the free end of the pawl and keep it in engagement with the wheel M, the end of the pawl slipping over the teeth of the wheel, however, on the backward movement of the lever. The lever N is pivoted to a standard C, at the point shown by the dotted circle in Fig. 6, and is under control of a scroll-cam, N', on the shaft G, so that on each rotation of the latter shaft there will be a vibration of the lever, the pawl $i'$ acting upon the wheel M and turning the same forward to the extent of one tooth, a retaining-pawl, $i^3$, preventing back movement of the wheel. The sliding plate L has a slot, $k$, for the reception of the shaft J, and on the front end of the plate is a lug, $k'$, which serves to engage with and retain one of the arms $f$, against which the grain is forced by the fingers $a$ of the disk E' during the bundling operation, the rear end of the plate L having a pin, $k^2$, with anti-friction roller adapted to a curved slot, $k^3$, in the boss $K^2$. (See Fig. 4.) The shaft J has an arm, $J^4$, with pin $J^5$, provided with an anti-friction roller, and on the under side of the plate L is a projection, $k^4$, on which this roller acts, as described hereinafter. During the bundling of the grain the shaft J remains stationary; but the arm $f$ swings forward from the position shown in Fig. 4 to that shown in Fig. 24, the plate L following this movement, and the lug $k'$ being kept in engagement with the end of the arm $f$ by reason of the depression of the rear end of the plate, owing to its being under control of the curved slot $k^3$, the shaft J serving as the fulcrum on which the plate swings. In the absence of this provision the end of the arm $f$ would be freed from the control of the lug $k'$, owing to the fact that said end moves in the arc of a circle of which the shaft I is the center. By this movement of the plate L the twine guiding eye $y'$ is caused to approach the eyes $y$ and $y^2$, and sufficient slack twine is thus produced to pass around the front of the bundle. When the parts reach the position shown in Fig. 24, the proper amount of grain has been accumulated, the packer-shaft F is thrown out of gear, and the movement of the shaft G commences. This causes a rocking of the shaft J, and the needle K swings upward, so as to compress the rear of the bundle and carry the binding-twine around the same. At the same time the roller on the arm $J^4$ of the shaft J acts upon the projection $k^4$ of the slide L, thrusting the same rearward and causing an inward movement of the arm $f$, as shown in Fig. 25, so as to compress the front of the bundle, the eye $y'$ being moved away from the eyes $y$ $y^2$, so as to take up the slack of the binding-twine and cause the latter to closely confine the bundle, the final result of the action of the roller of the arm $J^4$ being to support the slide L, so as to prevent the lug $k'$ of the same from releasing the arm $f$ until the binding-twine has been caught and the arm K commences to move down. The support is then withdrawn from the slide L, the front end of which drops, so as to depress the lug $k'$ and release the arm $f$, the front end of the slot $k$ having an offset, $k^5$, in order to permit this depression. When the arm $J^4$ reaches the limit of its forward movement, it raises the front end of the slide, so as to again bring the lug $k'$ into position for retaining the arm $f$. (See Fig. 27.) Owing to the fact that the shaft J derives its rocking motion from the crank-pin $J^3$, there is a dwell in the movement while said pin is passing the center, and before the needle K, after having been fully raised, commences to return, and it is during this time that the operation of the devices for retaining the ends of the binding-twine takes place. This operation is shown in Figs. 28, 29, and 30, on reference to which it will be seen that the upper end of the needle carries the twine $x$ between two of the teeth, $x'$ and $x^2$, of the wheel M, as in Fig. 29, an opening, $M^2$, Fig. 6, being formed in the standard for the entrance of the said upper end of the needle. While the twine is in this position the lever N is operated so as to cause the turning of the wheel M to the extent of one tooth, the twine being thereby caught between the tooth $x^2$ and a tooth of the wheel M' and being laid around said tooth $x^2$ on the return movement of the needle, as shown in Fig. 30. It should be understood that the front end of the twine is held between the wheel M' and the tooth $x'$ of the wheel M, as the result of a former operation, so that when the parts reach the position shown in Fig. 30 both ends of the twine which confines the bundle will be held, one end between the face of the wheel M and the end of a tooth, $x^5$, of the wheel M', the other end of the twine being held between the tooth $x^2$ of the wheel M and a tooth, $x^6$, of the wheel M'. The spindle of the wheel M has at one end a nut, $m$, between which and the standard C intervenes a spring, $m'$, Fig. 7, so that the wheel is at liberty to yield to accommodate inequalities in the thickness of the twine or to act upon different grades of twine. The ends of the twine being thus held, the next operation is to tie a knot in the twine; hence I now describe the fourth feature of my invention—the devices for tying the knot in the binding-twine. For an understanding of these, reference should be had to Figs. 5, 6, 9, 10, 11, 12, 13, 21, 22, 23, and diagrams, Figs. 31 to 35.

The knotter consists of a pair of clamping-jaws, $p$ and $t$, the jaw $p$ forming part of a hooked shank, P, Fig. 21, which is slotted for the reception of a lever, T, of which the other jaw, $t$, forms one arm, this lever being pivoted to the shank, and the other arm, $t'$, of the lever having a roller which is under the influence of a cam-plate, $t^2$, and springs $t^4$ and $t^5$ on the standard C. When the knotter commences to swing, the roller on the arm $t'$ of the lever T is acted upon by the spring $t^4$, Fig. 9, which keeps the jaws closed until the roller at the end of the arm comes under control of the cam-plate $t^2$, the roller traveling on the outer side of this plate, which is so shaped as to throw the end of the arm $t'$ outward, and thus open the jaw $t$ of the knotter. The roller of the arm $t'$ is finally acted upon by the spring $t^5$, which presses the arm inward when it reaches the end of the cam-plate $t^2$, and thus closes the jaw $t$, the roller, during the reverse movement of the knotter, traveling along the inside of the cam-plate, so as to keep the jaw closed. The jaw $t$ has a pin, $t^3$, which, when the jaw is closed, enters an opening, $p'$, in the jaw $p$, for a purpose described hereinafter. The shank P is secured to a horizontal shaft, S, to which a rocking motion is imparted by the gearing shown in Figs. 5, 10, and 11. On the shaft S are two spur-wheels, S' and S², and on the shaft G are two toothed segments, G' and G², the segment G' being adapted to gear into the spur-wheel S', and the segment G² gearing into a pinion, I', on the shaft I, on which are also two toothed segments, I², which are adapted to gear into the spur-wheel S² of the shaft S. The segments are such that on each revolution of the shaft G there will be a half-revolution of the shaft I, due to the engagement of the segment G² with the pinion I', a partial revolution of the shaft S in one direction, due to the engagement of the segment G' with the wheel S', and a partial revolution of said shaft in the opposite direction, due to the engagement of one or other of the segments I² with the wheel S². The binding-needle K works in a slot, K⁶, in the standard C, said slot being inclined at the front end, which is adjacent to the knotter, as shown in Fig. 12. Into the slot K⁶ projects the end of a tucker, V, which is pivoted to the standard at V', and has a finger, V², against which bears a spring, V³. The point of the tucker V is in the path of the binding-needle, and as the latter moves forward it strikes the tucker, the point of which catches the twine and carries the same along in advance of the needle, so as to direct it through the inclined end of the slot K⁶, and to within reach of the knotter, so as to insure the laying of the twine at an angle across the path of the jaws $p\,t$, and thus insure the catching of the said twine as the knotter rotates, as described hereinafter. The front edge of the tucker V travels at a much faster rate than the needle, owing to the fact that the rear edge of the plate on which the needle acts is cam-shaped, as shown.

Figure 31:
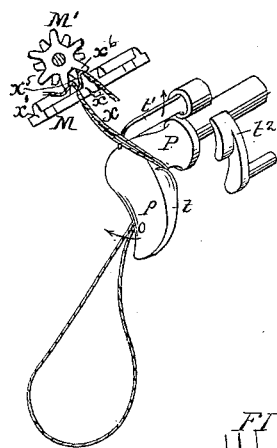
Figure 32:
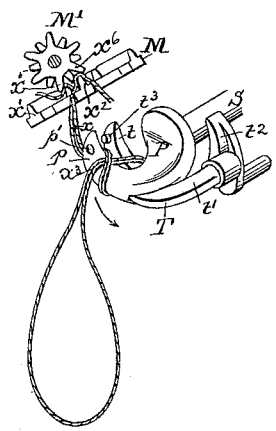
Figure 33:
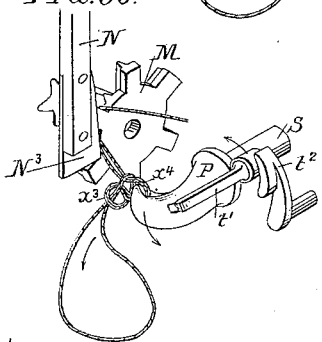
Figure 34:
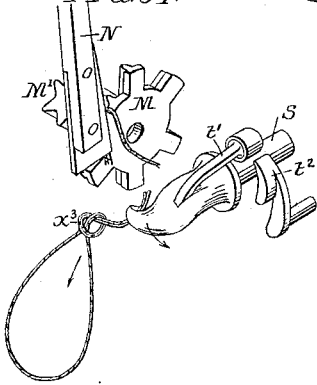
Figure 35:
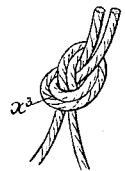

The action of the knotter is illustrated in Figs. 31 to 35. When the binding-needle has finished its work, the two ends of the twine are laid over the shank of the knotter, as shown in Fig. 31, the portions of the twine between the knotter and the bundle being carried laterally into the path of the jaws $p\,t$, owing to the action of the tucker V and the inclined end of the slot K⁶, as above stated. A partial rotation in the direction of the arrow, Fig. 31, is now imparted to the knotter, so that the jaws will catch the twine and form a loop, $x^3$, on the shank, the jaws $p\,t$ opening during the latter part of the movement, so that the ends of the twine enter the jaws, as shown in Fig. 32. As the knotter reaches the end of its movement in this direction, the arm $t'$ of the jaw $t$ passes from under the control of the cam-plate $t^2$, and the jaws close as the knotter commences to move backward. As this movement continues, the loop $x^3$ slips off the jaws and a second loop, $x^4$, is drawn through the first loop, as shown in Fig. 33, and as the ends of the twine are drawn tight a knife, N³, forming part of the lever N, severs the twine, as shown in Fig. 34, and as the knotter continues to move, the loose ends of the loop $x^4$ are drawn through the loop $x^3$ and around the pin $t^3$, so as to form the close knot shown in Fig. 35.

The remaining feature of my invention is the device for retaining and delivering the bundle.

I have already described how the bundle is formed against the arm $f$, how the latter gradually yields during this formation, is then drawn inward by the plate L, and finally released from the control of the plate. After the formation of the knot in the binding-twine the segment G² acts upon the pinion I' of the shaft I, so as to turn said shaft half-way around, the lower arm $f$ being thus moved out of the way of the bound bundle, and the upper arm $f$ striking the latter and delivering it from the side of the table A onto the ground, the arm $f$ being then caught by the lug $k'$ of the plate L and held in position during the formation of a fresh bundle. A device supplementary to the arms $f$ is used to assist in the duty of retaining and delivering the bundle, this device consisting of a pair of levers, W, hung to a double crank, W', on the end of the shaft I, as shown in Fig. 5, and passing through beveled openings W³, Fig. 8, in a block, W², pivoted to the standard C. By this arrangement, on each half-turn of the shaft I, the lower arm of one of the levers W is raised from the front of the bundle and then carried rearward over the top of the same, while the lower arm of the other lever is caused to descend behind the bundle and then moved forward, so as to aid in thrusting the bundle from the table, being left in such a position that it will aid the arm $f$ in effecting the retention of the grain fed forward on the table A by the packer-fingers to form another bundle.

Having thus described in detail the various parts of the apparatus, it will suffice to give a brief description of the general operation.

The grain is fed onto the table A by the belt A', and is fed forward by the fingers $a$ of the disk F' against the retaining-arm $f$, which gradually yields, drawing forward the plate L, and causing the eye $y'$ to approach the eyes $y$ $y^2$, so as to form sufficient slack twine to embrace the front of the bundle. The proper amount of grain having been accumulated, the movement of the packer-shaft F and feed-belt A' is arrested and the shaft G thrown into gear and given one revolution. The first effect of this is to bring forward the binding-needle K, the operation of which effects the retraction of the arm $f$, so as to compress the bundle, the plate L also being retracted, so that the eye $y'$ is moved away from the eyes $y$ $y^2$ and takes up the slack in the twine formed by this compression of the bundle. The needle having reached its highest point, the twine is caught and held by the wheels M M' and the needle retracted. The knotter P then forms the knot in the twine, and the bound bundle is delivered from the table by the action of the arm $f$ and lever W.

It will be observed that the greater portion of the mechanism is above the table A in my improved machine, so that the table can be placed close to the ground, this being a desirable feature. The grain, moreover, is not elevated for the action of the binding devices, but has a free passage over the horizontal table to the point of discharge.

I claim as my invention—

1. The combination of the table, the packer-shaft having a disk, means for rotating said packer-shaft, levers hung to the disk and connected together, and a pin for acting on the levers successively as the disk rotates, all substantially as specified.

2. The combination of the driving-sleeve having a pinion, $h$, with a finger, $h'$, the packer-shaft, a clutch-sleeve splined thereto, a binder-shaft having a spur-wheel, H, with space $c$, lug $c^2$, and inclined projection $c^3$, and the bar $g$, connected to the clutch-sleeve and having a finger adapted to act upon the projection $c^3$, all substantially as specified.

3. The combination of the driving-sleeve having a pinion, $h$, with a finger, $h'$, the packer-shaft, a clutch-sleeve splined thereto, a binder-shaft having a spur-wheel, H, with notched flange H', space $c$, lug $c^2$, and inclined projections $c^3$ $c^4$, and the bar $g$, connected to the clutch-sleeve and having fingers $g'$ $g^2$, all substantially as specified.

4. The combination of the vibrating binding-needle, the pivoted retaining-arm $f$, and the catch-plate L, free to slide with the arm, as set forth.

5. The combination of the binding-needle, the pivoted retaining-arm $f$, the sliding catch-plate, and means for depressing the rear end of the latter as it slides, as specified.

6. The combination of the binding-needle, the retaining-arm $f$, the sliding catch-plate, its twine-guiding eye $y'$, and fixed eyes $y$ $y^2$, forming an automatic let-off and take-up for the twine, as set forth.

7. The combination of the binding-needle, the retaining-arm $f$, the catch-plate having a projection, $k^4$, and the arm $j^4$ on the shaft of the binding-needle, as described.

8. The combination of the binding-needle and its shaft J, having an arm, $J^4$, the retaining-arm $f$, and the sliding plate L, having a projection, $k^4$, and a slot, $k^2$, with enlargement $k^5$, as set forth.

9. The combination of the vibrating binding-needle with a cord-holder consisting of a pair of bevel-wheels, M M', mounted independently of the binding-needle and rotating in a plane transverse to the plane of vibration of said needle, said wheel M having a tooth projecting beyond its periphery, and means for moving the wheel M when the needle is up, whereby, on the descent of the needle, the cord will be wrapped around a projecting tooth of the wheel and drawn off transversely therefrom, all substantially as specified.

10. The combination of the wheel M', the wheel M, having lugs $i$, the lever N, having a pawl, $i$, and a cam for vibrating the lever, all substantially as specified.

11. The within-described knotter, consisting of a hooked shank with fixed jaw and lever, gearing for partially rotating the shank first in one direction and then in the other, a spring for acting on the lever to keep the jaws closed during the first part of the forward movement, a cam-plate for opening the jaws during the latter part of said movement, and a second spring, whereby the lever-arm is depressed to again close the jaws during the reverse movement, all substantially as specified.

12. The combination of the shaft G, having toothed segments G' and $G^2$, the shaft S, carrying the knotter and having spur-wheels S' and $S^2$, and the shaft I, having a spur-wheel, I', and segments $I^2$, as set forth.

13. The combination of the shaft I and its arms $f$ with the lever, W, double crank W', and pivoted block $W^2$, as specified.

In testimony whereof I have signed my name to this specification in the presence of two subscribing witnesses.

JOHN H. McCUTCHEON.

Witnesses:
HARRY SMITH,
HENRY HOWSON, Jr.